United States Patent
Welti

[11] 4,084,137
[45] Apr. 11, 1978

[54] MULTIDIMENSIONAL CODE COMMUNICATION SYSTEMS

[75] Inventor: George R. Welti, Leesburg, Va.

[73] Assignee: Communications Satellite Corporation, Washington, D.C.

[21] Appl. No.: 717,439

[22] Filed: Aug. 24, 1976

[51] Int. Cl.² ............................................. H03K 7/10
[52] U.S. Cl. ...................................... 325/30; 178/67; 325/40; 325/61; 343/100 PE
[58] Field of Search .................... 325/30, 38 R, 39, 40, 325/41, 42, 56, 59, 61; 178/66 R, 67, 113; 340/146.1 A, 146.1 AB, 146.1 AL, 146.1 AQ, 146.1 BE; 343/200, 100 PE

[56] References Cited

U.S. PATENT DOCUMENTS

| | | | |
|---|---|---|---|
| 3,706,945 | 12/1972 | Yanagidaira et al. | 178/66 R |
| 3,745,528 | 7/1973 | Patel | 340/146.1 AL |
| 3,849,595 | 11/1974 | Ishiguro | 325/30 |

Primary Examiner—Benedict V. Safourek
Attorney, Agent, or Firm—Sughrue, Rothwell, Mion, Zinn and Macpeak

[57] ABSTRACT

Phase and amplitude modulation of single or multiple pulses and/or dual polarizations are used in a digital communications system which transmits multidimensional codes. Four dimensional code transmission is specifically disclosed, although the scheme may be extended to eight-dimensional and even 16-dimensional code transmission. The four-dimensional codes are constructed by mapping a digital word into two two-dimensional plane as two sets of $x$ and $y$ coordinates. Signals proportional to these $x$ and $y$ coordinates are used to modulate a transmitted pulse or pulses. When a single pulse is used to transmit the four-dimensional code, polarization modulation is used. A signal proportional to the square root of the sum of the squares of the coordinates assigned to both the horizontal and vertical polarizations is used to control the total RF amplitude of the pulse. A signal proportional to the ratio of the square roots of the sum of the squares to each set of coordinates is used to control the ratio of horizontal to vertical polarization. Finally, the phases of the two polarizations are controlled by signals proportional to the ratios of the coordinates in the respective sets of coordinates. When two pulses are used to transmit the four-dimensional code, quadrature amplitude modulation is used. Signals proportional to the coordinates of each set are used to quadrature amplitude modulate a respective one of the two pulses. Encoding and decoding between digital and the four-dimensional code is accomplished with read only memories.

10 Claims, 15 Drawing Figures

MULTIDIMENSIONAL CODE COMMUNICATION SYSTEMS

BACKGROUND OF THE INVENTION

The present invention generally relates to digital communication systems, and more particularly to multidimensional code communication systems using polarization, amplitude and phase modulation of one or a plurality of RF carriers and one or multiple pulses.

Quadrature amplitude modulation is widely used in data modems for the transmission of digital data over telephone voice channels. It is also employed in the form of four-phase PSK for PCM transmission of telephone voice channels over satellite transponders. The advantages of quadrature amplitude modulation for digital transmission have been pointed out by a number of investigators. Some have concentrated on two-dimensional signal mappings. See for example C. R. Cahn, "Combined Digital Phase and Amplitude Modulation Communications Systems", *IRE Transactions on Communication Systems*, December 1960, pp. 232 to 237. Other investigators have considered multidimensional codes. See for example D. Slepian, "Permutation Modulation", *Proceedings of the IEEE*, March 1965, pp. 228 to 236, and R. Ottoson, "Group Codes for Phase- and Amplitude-Modulated Signals on a Gaussian Channel", *IEEE Transactions on Information Theory*, May 1971, pp. 315 to 321.

According to one aspect of the invention, an enhanced form of quadrature amplitude modulation is obtained by introducing coding in multidimensional space. This leads to greater efficiencies in terms of power and bandwidth utilization. According to another aspect of the invention, the same multidimensional coding can be advantageously used by exploiting the two dimensions of polarization space. In either case, the multidimensional codes permit substantial reduction in bandwidth with minimum increase in power consumption. Although codes based on triangular lattices have been shown to provide the densest packing in two dimensions, practical modem implementations have generally incorporated non-optimum square rectangular grids. See M. K. Simon and J. G. Smith, "Hexagonal Multiple Phase- and Amplitude- Shift-Keyed Signal Sets", *IEEE Transactions on Communication Systems*, October 1973, pp. 1108–1115. G. R. Welti and J. S. Lee in "Digital Transmission with Four-Dimensional Modulation", *IEEE Transactions on Information Theory*, July 1974, pp. 497–502, have presented a general method for constructing compact four-dimensional codes and have calculated the performance of certain four-dimensional codes with a four-dimensional peak energy constraint. The purpose of the present invention is to provide practical modem implementations which advantageously incorporate such compact multidimensional codes.

SUMMARY OF THE INVENTION

The multidimensional code communication systems according to the present invention can be implemented by a large variety of transmission systems including, for example, multiple RF carriers operating with different polarizations and/or at different frequencies. Depending on the codes adopted and the choice of modulation, single or multiple pulses may be used. For purposes of describing the practice of the invention, four-dimensional codes are assumed; however, those skilled in the art will recognize that the teachings of the invention can be extended to eight-dimensional and even 16-dimensional codes. According to the illustrative embodiments of the invention, a four-dimensional code can be transmitted with either a single pulse or with two pulses. In either case, the four-dimensional codes are constructed by mapping a digital word in a two-dimensional plane as two sets of $x$ and $y$ coordinates.

When a single pulse is used to transmit the four-dimensional code, polarization modulation is used. A signal proportional to the square root of the sum of the squares of the coordinates assigned to both the horizontal and vertical polarizations is used to control the total RF power of the pulse. A signal proportional to the ratio of the square roots of the sum of the squares of each set of coordinates is used to control the ratio of horizontal to vertical polarization. Finally, the phases of the two polarizations are controlled by signals proportional to the ratios of the coordinates in the respective sets of coordinates.

When two pulses are used to transmit the four-dimensional code, quadrature amplitude modulation is used. The coding logic receives a digital word and generates at its output a sequence of digital values of $x$ and a parallel sequence of digital $y$ values. These are converted to a sequence of pulsed $x$ and $y$ amplitudes by a pair of digital-to-analog converters. The pulse waveforms are altered by shaping filters and then used to modulate quadrature carriers.

The demodulator in each system performs the inverse functions of the modulator, and the received digitized samples are converted to a digital output stream by a decoding logic. In its preferred form, the decoding logic includes three read only memories. The first read only memory produces for each input combination of $x$ and $y$, an output combination of two digits. Assuming a seven-bit output digital word $(b_1, b_2, b_3, b_4, b_5, b_6 b_7)$, the first of these digits is octal and represents the three-bit word $(b_2, b_3, b_4)$ under the hypotheses that bit $b_1$ is equal to 0 and 1, respectively. The second of these digits represents $(b_5, b_6, b_7)$ under the same hypotheses. These hypotheses are then tested with the aid of the second read only memory, which emits difference components between the received $(x,y)$'s and the $(x,y)$'s associated with the codeword indices, and with the aid of the third read only memory, which emits a threshold test result in the form of the binary digit $b_1$.

In order to detect the four-dimensional code modulated signal, circuitry is provided to perform the following functions:

1. Clock timing recovery to detect pulse modulated signals.
2. Word timing recovery to distinguish between two pulses.
3. Carrier phase recovery to detect phase modulated signals.
4. Automatic level control to detect amplitude modulated signals.
5. Offset control to compensate for drift in the demodulator circuit.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENTS

A code can be specified in the form of set of distinct vectors or codewords, $$C_i = (x_{i1}, Y_{i1}, x_{i2}, Y_{i2}), \quad i = 1, 2, \ldots, M$$

where $M$ is the length of the code, and $C_i$ represents the $i$-th codeword. The two-dimensional peak energy constraint requires that $$\max_{i,k} (x_{ik}^2 + y_{ik}^2) = \hat{E}_2 d^2 \begin{cases} i = 1,2,\ldots, M \\ k = 1,2, \end{cases}$$

where $\hat{E}_2$ is the normalized peak energy and $d$ is the minimum Euclidian distance between codewords:

$$d = \min_{\substack{i,k \\ i \neq k}} \sqrt{(x_{i1} - x_{k1})^2 + (y_{i1} - y_{k1})^2 + (x_{i2} - x_{k2})^2 + (y_{i2} - y_{k2})^2}$$

A code that minimizes $\hat{E}_2$ for a given value of $M$ will be called compact. A class of compact codes can be obtained by setting $$x_{i1} = (x_o + e_i)/\sqrt{2}$$

$$Y_{i1} = (Y_o + e_i + 2f_i + k_i)/\sqrt{2}$$

$$x_{i2} = (x_o = g_i)/\sqrt{2}$$

$$Y_{i2} = (Y_o + g_i + 2h_i + k_i)/\sqrt{2}$$

where $e_i, f_i, g_i, k_i$ are suitably chosen integers, where $k_i$ is either 0 or 1, and where the biases $x_o, y_o$ depend on the subclass, $$(x_o, y_o) = \begin{cases} (0,0) & \text{subclass 0,} \\ (0, 0.5) & \text{subclass 1,} \\ (0.5, 0.5) & \text{subclass 2.} \end{cases}$$

Figure 1:
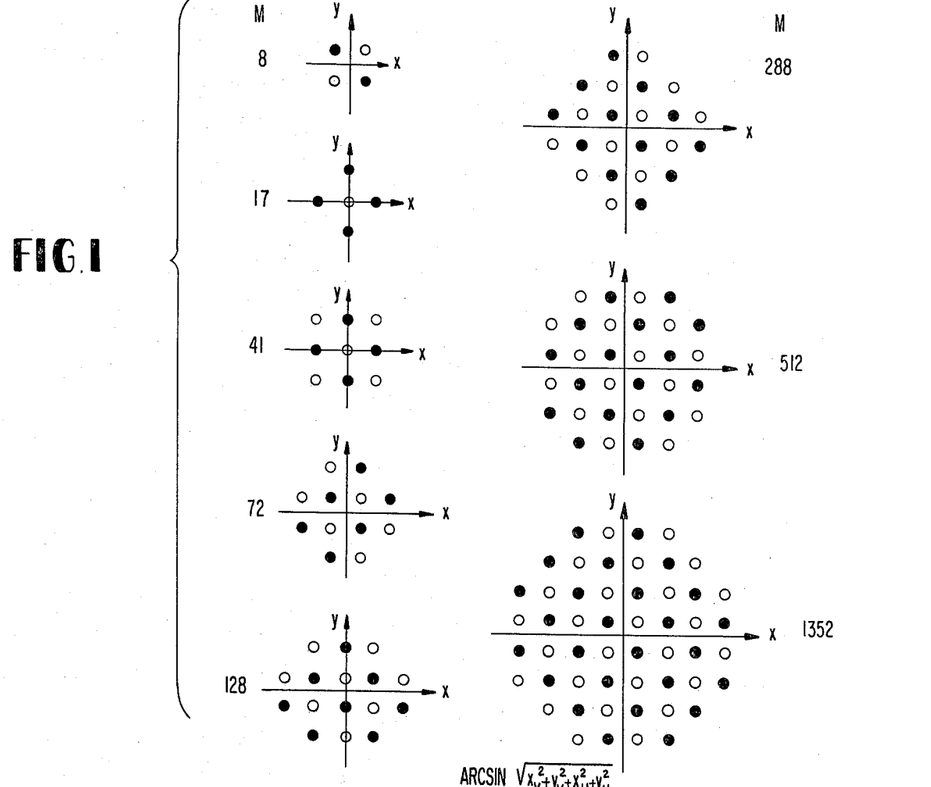
FIG. 1 is a graphical mapping of some examples of a four-dimensional codes in two-dimensional space.

Note that for the components of each codeword, vectors are made interdependent by the intergers $e_i, g_i$ and $k_i$. The difference vector between distinct codewords $i$ and $j$ is $(e_i - e_j, e_i - e_j + 2f_i - 2f_j + k_i - k_j, g_i - g_j, g_i - g_j + 2h_i - 2h_j + k_i + k_j)/\sqrt{2}$ and is contained in the subclass 0 code. The number of components in which two neighboring codewords differ is exactly two. For example, if $e_i = e_j, f_i = f_j, g_i = g_j$ and $h_i = h_j$ but $k_i \pm k_j$, then the difference vector is $(0, +1, 0, +1)/\sqrt{2}$ and has unit length. A codeword can have no more than 24 nearest neighbors, since there are six possible combinations of two non-zero components among the four components, and each combination can produce four sign patterns. These codes have $d = 1$. Some compact codes in this class are illustrated in FIG. 1. In FIG. 1, the points which are open circles correspond to codewords with $k = 0$, and the points which are solid circles correspond to codewords with $k = 1$. Compact codes for other values of M can be derived from these codes. In FIG. 1, each graphical plot is referred to as a code constellation. Note that the code constellation for $M=8$ is identical to a four-phase PSK constellation. This is also true of the $M=17$ constellation if the point at the origin is ignored; however, to do so eliminates the interdependence of codeword components which is an important feature of the codes employed by the communication systems according to the invention. This interdependence of codeword components provides distinct improvements in the statistical probability of erroneously decoding a codeword, especially for values of $M=41$ and greater.

The quality of a digital communications link is measured in terms of its error statistics. The salient statistic for many applications is the number of decoding errors (not bit errors) per bit, $P_B$. In conventional two- and four-phase PSK systems, each bit is decoded independently, and the distinction between decoding errors and bit errors is lost. In quadrature amplitude modulation systems, a decoding error usually produces more than one bit error; nevertheless, only a single error event is actually perceived by the user. System comparisons should, therefore, be made on the basis of equal decoding error rates.

The probability P of decoding a codeword erroneously with a maximum-likelihood detector is very closely upper-bounded by the union bound. For additive Gaussian noise, this bound takes the form $$P = \frac{N}{\sqrt{2\pi}} \int_{d/2\sigma}^{\infty} \exp\left(\frac{-t^2}{2}\right) dt$$

where $\sigma$ is the noise variance per dimension. N is average number of nearest neighbors, or $$N = \frac{1}{M} \sum_{i=1}^{M} \sum_{k=1}^{M} \delta(|C_i - C_k| - d)$$

where $$\delta(M) = \begin{cases} 1, M = 0 \\ 0, M \neq 0 \end{cases}$$

The peak carrier-to-noise power ratio is $$\hat{\gamma} = \hat{E}_2 d^2/2\sigma^2$$

and the number of decoding errors per bit is $P_B = P/\log_2(M)$. Therefore, $$P_B = \frac{N}{\sqrt{2\pi} \log_2(M)} \int_{\sqrt{\frac{\hat{\gamma}}{2\hat{E}_2}}}^{\infty} \exp(\frac{-t^2}{2}) dt.$$

The average carrier-to-noise power ratio is $$\overline{\gamma} = \frac{1}{4\sigma^2 M} \sum^{M} |C_i|^2 = \frac{\overline{E}_2 d^2}{2\delta^2},$$

where $\overline{E}_2$ is the normalized average energy; therefore $$\overline{\gamma} = \hat{\gamma} \hat{E}_2/\overline{E}_2.$$

Values of N, $\hat{E}_2$, & $\overline{E}_2$ for M = 8 to 1352 are listed in Table I. The information transmission rate for given bandwidth is $R = 2 \log_2(M)$ bits per cycle.

Table I.

| | Code Characteristics | | |
|---|---|---|---|
| Code Length M | Nearest Neighbor Number N | Peak Energy $\hat{E}_2$ | Average Energy $\overline{E}_2$ |
| 8 | 6.000 | 0.250 | 0.250 |
| 17 | 5.647 | 0.500 | 0.471 |
| 18 | 8.111 | 0.625 | 0.458 |
| 41 | 10.537 | 1.000 | 0.683 |
| 72 | 11.778 | 1.250 | 0.917 |
| 97 | 10.392 | 2.000 | 1.196 |
| 128 | 13.266 | 2.125 | 1.250 |
| 225 | 14.436 | 2.500 | 1.653 |
| 242 | 14.091 | 3.125 | 1.773 |
| 288 | 14.667 | 3.250 | 1.917 |
| 338 | 15.485 | 3.625 | 2.010 |
| 512 | 16.313 | 4.250 | 2.500 |
| 697 | 16.390 | 5.000 | 2.967 |
| 722 | 16.889 | 5.625 | 2.928 |
| 800 | 16.563 | 6.125 | 3.089 |
| 968 | 16.711 | 6.250 | 3.523 |
| 1017 | 17.400 | 6.500 | 3.575 |
| 1352 | 17.763 | 7.250 | 4.096 |

Figure 2:
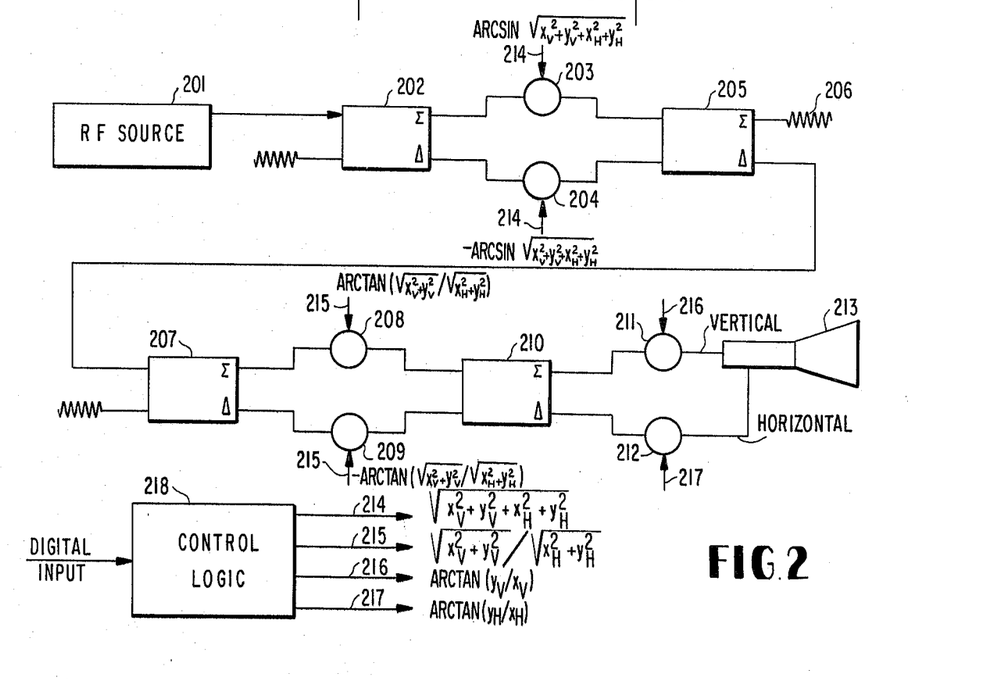
FIG. 2 is a block diagram of a pulse amplitude, phase and polarization modulator for transmitting a four-dimensional code in a single pulse.

One implementation of the modulator using the compact four-dimensional codes is shown in FIG. 2. A radio frequency source 201 is connected to an input port of a hybrid coupler 202, the outputs of which feed phase shifters 203 and 204. The two phase shifted signals are fed to hybrid coupler 205, and the radio frequency power is divided between the outputs of this coupler in accordance with the signal of control inputs 214 common to the two phase shifters 203 and 240. A portion of the energy is dumped into load 206 while the remainder passes through a second series of hybrid couplers and phase shifters 207, 208, 209 and 210. The outputs of coupler 210 have power levels controlled by the signal at inputs 215 common to the two phase shifters 208 and 209 and are individually phase shifted in phase shifters 211 and 212 prior to passing to feed horn 213. The phase shifters 211 and 212 are individually controlled by inputs 216 and 217, respectively. Thus, the total radio frequency power output is controlled by signal 214. The ratio of horizontal to vertical polarization is controlled by the signal at inputs 215. Finally, the phases of the two polarized components are individually controlled by signals at inputs 216 and 217. The four control signals to inputs 214, 215, 216 and 217 are generated by control logic 218 which is fed by the digital input signal. The control logic may conveniently take the form of read only memories and digital-to-analog converters to produce the four analog control signals corresponding to the four-dimensional code being used.

Figure 3:
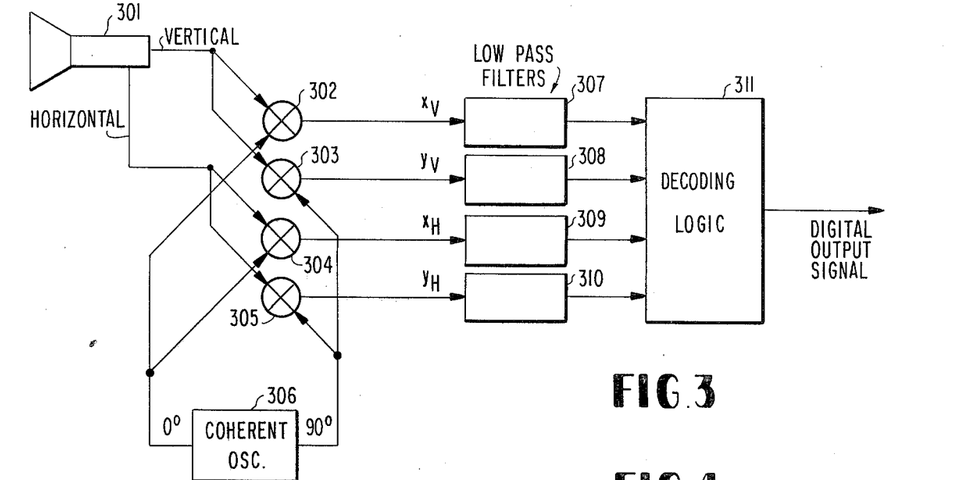
FIG. 3 is a block diagram of a receiver for detecting pulses modulated according to the arrangement of FIG. 2.

FIG. 3 illustrates the receiver. The transmitted signal is received by the horn 301 which provides horizontal and vertical polarization components as outputs. These outputs are supplied to mixers 302, 303, 304 and 305 which receive quadrature signals from the coherent oscillator 306 to demodulate the outputs from feed horn 301 and produce quadrature baseband signals which are passed through integrate and dump circuits 307, 308, 309 and 310 to the decoding 311. Thus, the decoding logic 311 receives four analog voltage levels and makes a digital output decision to produce a digital word corresponding to the digital input to the control logic 218 in the modulator. The decoding logic 311 may conveniently take the form of analog-to-digital converters and read only memories.

The implementation shown in FIGS. 2 and 3 is capable of transmitting a four-dimensional code in a single output pulse which has been modulated in amplitude, polarization and phase. The components of the code may be represented as $x_V$, $Y_V$, $x_H$ and $y_H$ where the subscripts denote vertical and horizontal polarizations, respectively. Alternatively, instead of using polarization as a modulation variable, time may be used. In other words, two quadrature amplitude pulses may be transmitted in timed succession. In this case the components of the code may be represented as $x_1$, $y_1$, $x_2$ and $y_2$ where the subscripts denote first and second pulses, respectively.

Figure 4:
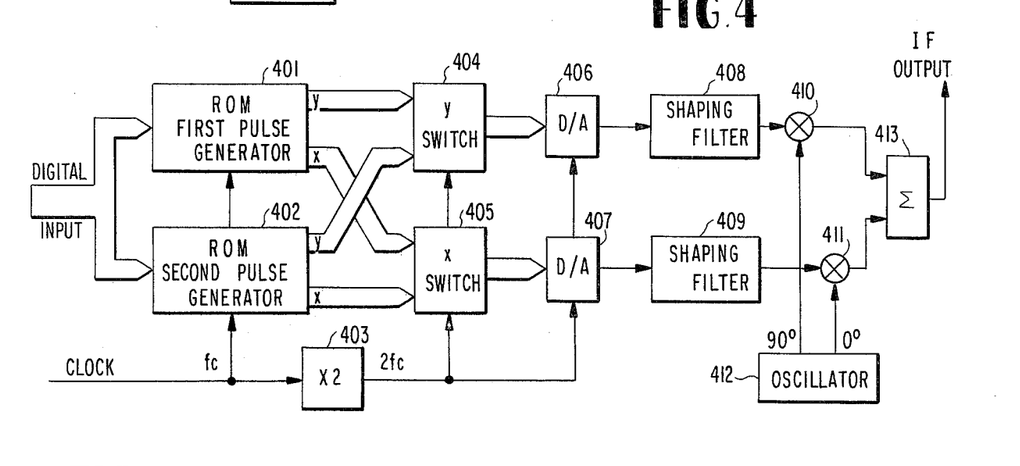
FIG. 4 is a block diagram of a two pulse quadrature amplitude modulator for transmitting a four-dimensional code.

The two pulse modulator block diagram is shown in FIG. 4. The modulator input is a sequence of multibit parallel digital words. As a specific example, for the code constellation shown in FIG. 1 for M=128, the digital word comprises seven bits since $7 = \log_2(128)$. Each input word $(b_1, b_2, \ldots, b_7)$ represents a codeword index $i$, $i = 0, 1, \ldots, M$-1. Input clock pulses are received at the rate of one pulse per input word, and are distributed to the first and second read only memory pulse generators 401 and 402, and via a frequency doubler 403 to the $x$ and $y$ switches 404 and 405 and digital-to-analog converters 406 and 407. The read only memory pulse generators 401 and 420 emit the $x$ and $y$ components of the first and second pulses in digital form. In the specific example given, the $M=128$ code employs five $x$ amplitudes and four $y$ amplitudes, and the $x$ and $y$ outputs consist of three and two bits, respectively. The first or second pulse components are selected by the $x$ and $y$ switches 404 and 405 and fed to the $x$ and $y$ digital-to-analog converters 406 and 407. The converters emit rectangular voltage pulses which are then shaped by shaping filters 408 and 409 to produce pulses whose squared Fourier transforms satisfy the Nyquist criteria for zero intersymbol interference. The filter outputs are fed to a pair of balanced mixers 410 and 411 with quadrature reference inputs from oscillator 412. The mixer outputs are combined at 413 to form an IF (or RF) output.

Figure 5:
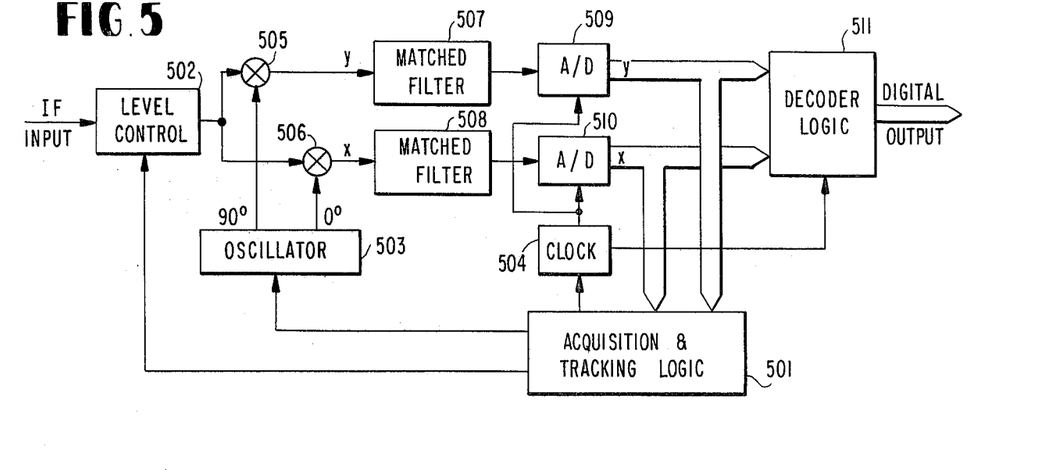
FIG. 5 is a block diagram of a receiver for detecting pulses modulated according to the arrangement of FIG. 4.

The demodulator block diagram is shown in FIG. 5. The functions of the acquisition and tracking logic 501 are to adjust the signal level via level control 502, the local oscillator 503 phase, and the clock 504 phase. After level adjustment, the IF (or RF) signal is converted to zero frequency and its components are separated by means of a pair of balanced mixers 505 and 506 with quadrature references from oscillator 503. The signals are passed through matched filters 507 and 508 to a pair of analog-to-digital converters 509 and 510, the outputs of which feed both the acquisition and tracking logic 501 and the decoder logic 511.

Figure 6:
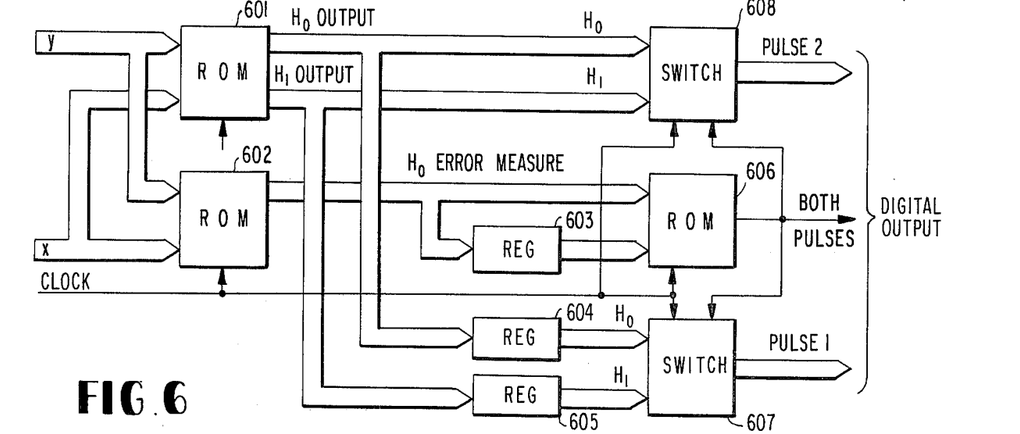
FIG. 6 is a block diagram of the decoder used in the receiver of FIG. 5.

The decoder logic is shown in greater detail in FIG. 6. Read only memories 601 and 602 each have a 10-bit address input, with the two 5-bit half-addresses provided by the $x$ and $y$ analog-to-digital outputs. For each received pulse, read only memory 601 emits two digital words, and read only memory 602 emits one digital word. These three words generated by the first pulse are stored in three separate registers 603, 604 and 605 for subsequent use.

Figure 7:
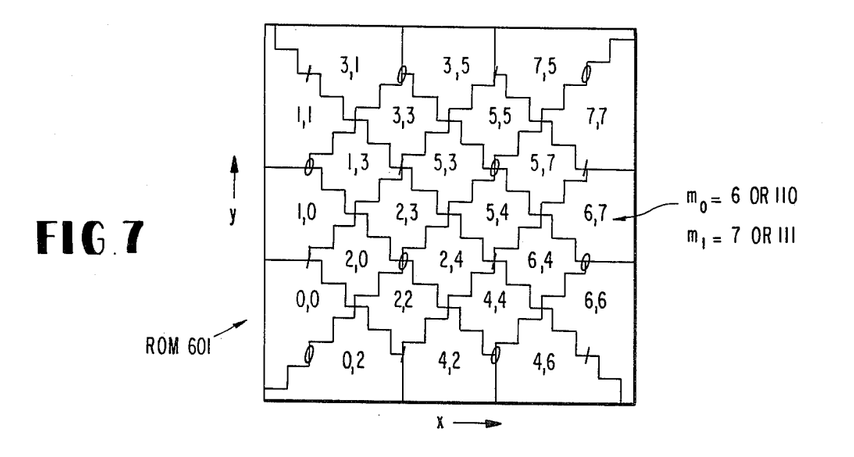
FIGS. 7, 8 and 9 are graphical mappings of the contents of the read only memories used in the decoder of FIG. 6.
Figure 8:
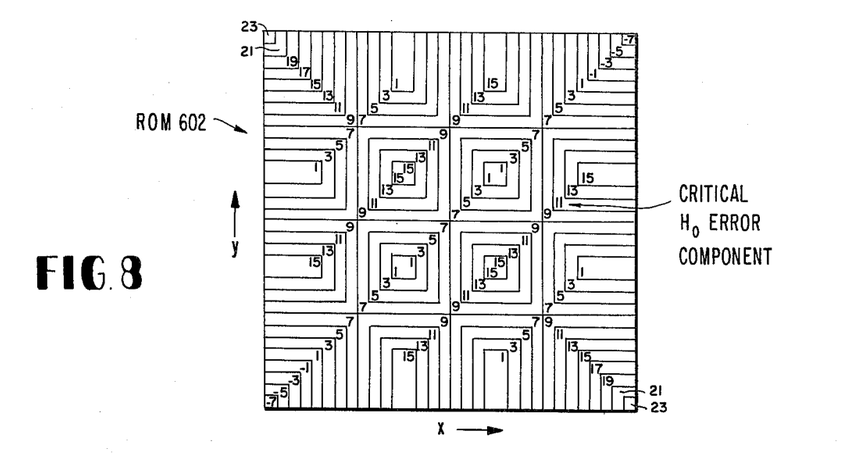

The contents of read only memory 601 are displayed in FIG. 7. In the specific embodiment illustrated, each input combination of $x$ and $y$ produces an output combination of two octal digits $m_o$ and $m_1$. For the first pulse, the digital $m_o$ and $m_1$ represent the three-bit word ($b_2$, $b_3$, $b_4$) under the hypothesis that bit $b_1$ is equal to 0 and 1, respectively. For the second pulse, $m_o$ and $m_1$ represent ($b_5$, $b_6$, $b_7$) under the same hypotheses. The hypothesis $b_1 = 0$ is tested with the aid of read only memories 602 and 605. As shown in FIG. 8, read only memory 602 emits a difference component between the received ($x$, $y$) and the ($x$, $y$) associated with codeword indices ($b_1$, $b_2$, $b_3$, $b_4$, ..., ..., ...) = (0, $m_o$, ...) for the first pulse, and with the codeword indices ($b_1$, ..., ..., ..., $b_5$, $b_6$, $b_7$) = (0, ..., $m_o$) for the second pulse. The component value emitted may be either the $x$ or $y$ value, whichever is needed to discriminate between the two hypotheses $b_1 = 0$ and $b_1 = 1$ (one component suffices in every case).

Figure 9:
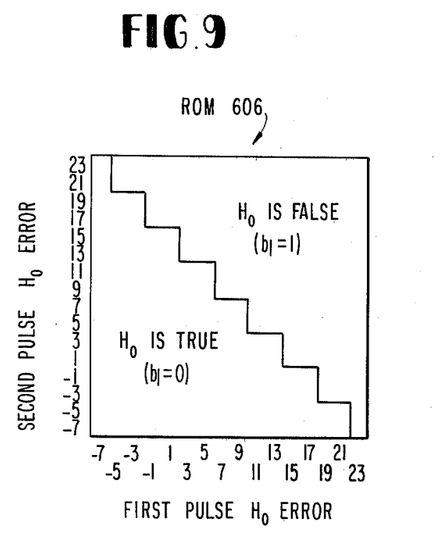

The sum of the selected component values for both pulses is tested against a threshold in read only memory 606 as shown in FIG. 9. If the sum is less than 16, the hypothesis $b_1 = 0$ is confirmed; if the sum is greater than 16, the hypothesis is rejected, and the hypothesis $b_1 = 1$ is accepted. If the sum equals 16, both hypotheses are equiprobable and the decision is made arbitrarily as illustrated.

Referring back to FIG. 6, the output of read only memory 606 is the accepted value of $b_1$. This value is fed to a pair of three-pole double-throw switches 607 and 608 to select $m_{b_1}$ for the first and second pulses as final outputs. Switch 607 is connected to receive the stored digital words generated by the first received pulse, and switch 608 is connected to receive the digital words generated by the second received pulse.

Important items for the realization of coherence recovery and control systems are high accuracy and stability and short acquisition time.

It is contradictory, however, to obtain high S/N of recovered signal and short acquisition at the same time. Therefore, two operation modes are used for the coherence recovery and control systems. One is the acquisition mode with a wide band feed-back loop filter so that acquisition time can be short. The other is the steady state mode with the narrow band loop filter so that high accuracy is obtained. These two modes are operated in time sequence in order to obtain both quick acquisition and high accuracy.

Stability is required not only for the two mode operation, but also for the joint operation among coherence recoveries and controls. For example, it is almost impossible to recover the carrier phase without the clock signal. Therefore, it is very important to establish the set-up procedure of each coherence recovery and each control so that the results, which have been recovered or controlled, should be utilized actively.

Overall recoveries and controls are divided into three steps. The first step includes in it the clock recovery, coarse automatic level control, and coarse carrier recovery. The second is monitoring period in which the degree of recoveries and controls of the first step are detected. In the third step, fine carrier recovery, fine automatic level control and offset control are performed. The monitor continues in the third step and when it detects an abnormal sympton, the third step is switched to the first step.

Figure 10:
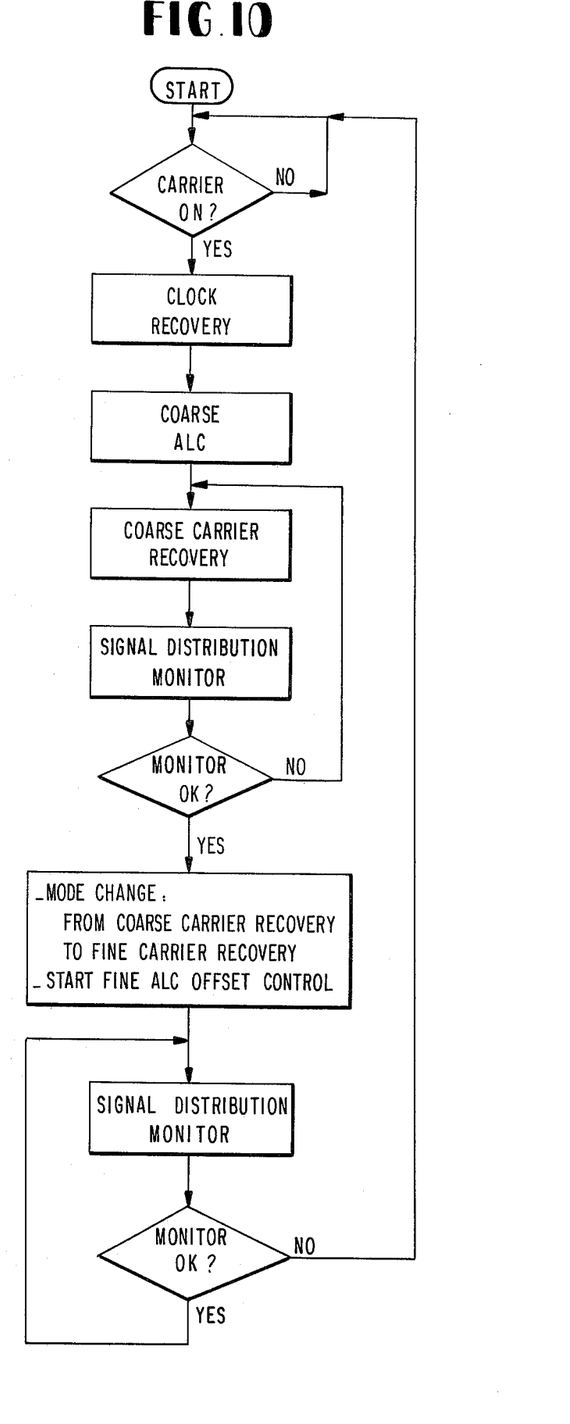
FIG. 10 is a flow diagram for the coherence recovery and control of the acquisition and tracking logic of the receiver of FIG. 5.

These steps are illustrated in the flow-chart shown in FIG. 10, as follows:

1. Clock recovery utilizing asynchronous carrier.
2. Coarse automatic level control at IF amplifier.
3. Coarse carrier recovery utilizing special symbol constellations with the read only memory.
4. Monitor of the degree of carrier recovery and automatic level control on carrier phase plane with the read only memory.
5. When the decision of the monitor is OK, fine carrier recovery, fine automatic level control and offset control are switched on. These recoveries and controls are performed with read only memories. Coarse carrier recovery is switched off. Coarse automatic level control is held in the final condition.
6. Monitor is being continued with the read only memory. When the monitor detects something unusual, recoveries and controls are started over again from (1).

Word timing recovery, in order to distinguish the first pulse and the second one, is ignored from here, because the constellation of the first pulse is the same as that of the second pulse. Then it is impossible to distinguish them only from constellation pattern. But, it is easy to distinguish them at the signal detector, because the same polarity symbol is sent on the first pulse and the second pulse.

Figure 11:
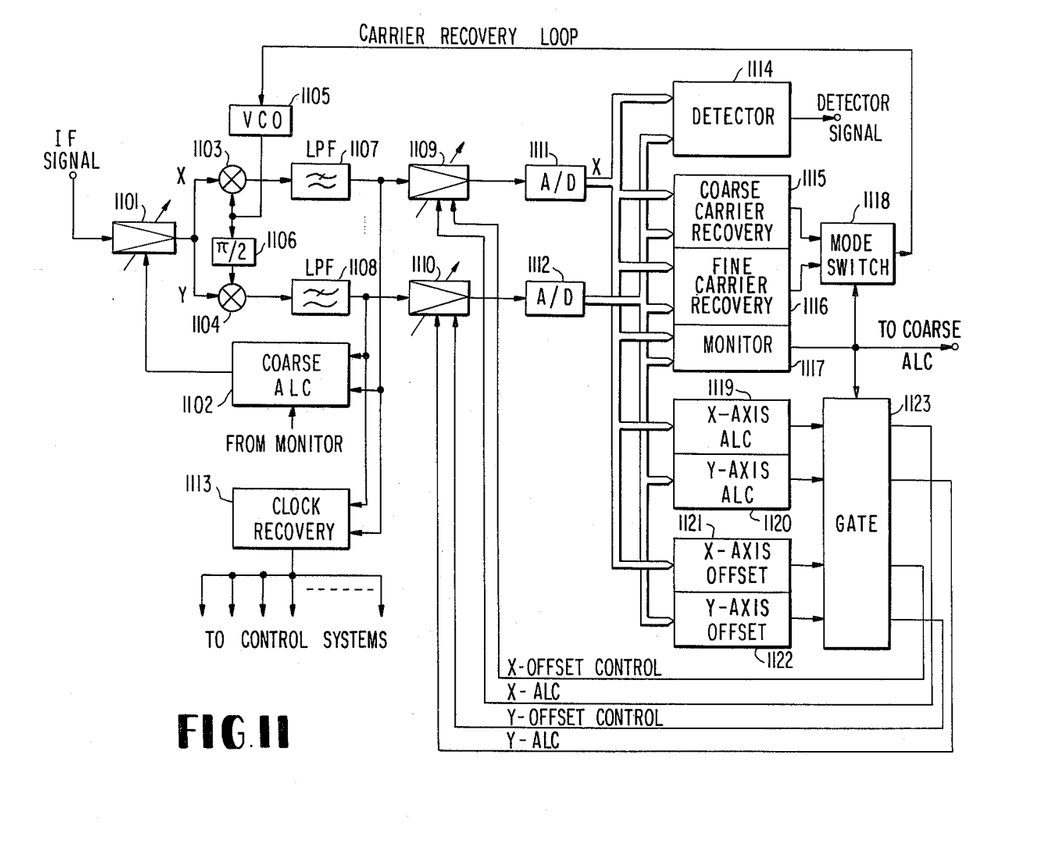
FIG. 11 is a block diagram of the coherence recovery and control system implementing the flow diagram of FIG. 10.

The block diagram of the coherence recovery and control systems is shown in FIG. 11. The IF signal comes into the coarse automatic level control amplifier 1101 and is controlled by coarse automatic level control circuit 1102 to get a constant IF signal power, then goes into the balanced mixers 1103 and 1104 and is converted to $x$ and $y$ baseband signal with quadrature reference carriers from voltage controlled oscillator 1105 and phase shifter 1106. The signals are passed through pulse shaping low pass filters 1107 and 1108 and fine automatic level control and offset control amplifiers 1109 and 1110 to analog-to-digital converters 111 and 112. Coarse automatic level control and clock recovery by circuits 1102 and 1113, respectively, are performed by utilizing the output signals of shaping filters 1107 and 1108. The analog-to-digital converter signals are fed to detector circuit 1114 and the recovery and control circuits for fine carrier recovery, fine automatic level control, offset control and monitor as described in more detail below.

Figure 12:
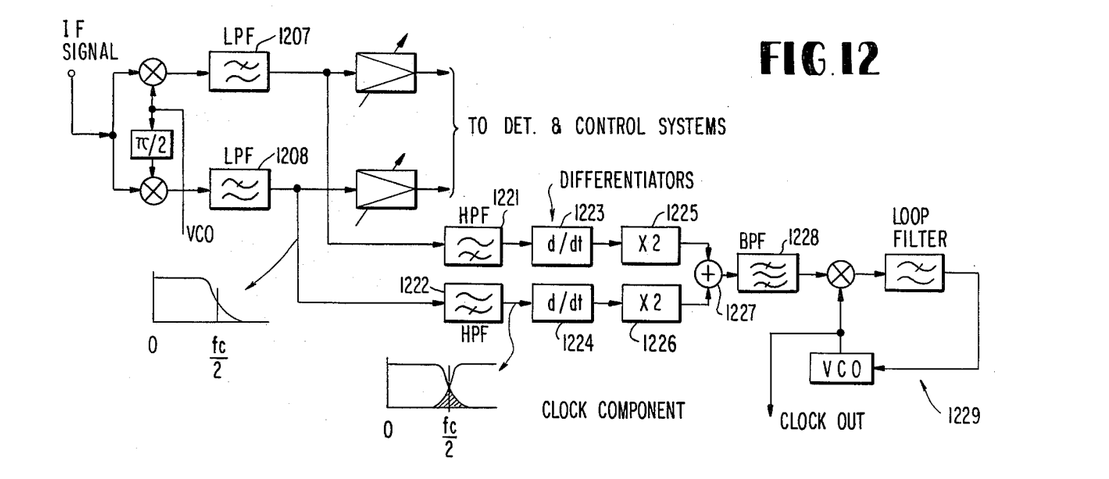
FIG. 12 is a block diagram of the clock recovery circuit used in the system of FIG. 11.

The block diagram of clock recovery circuit is shown in FIG. 12. The baseband output signals of the shaping filters 1207 and 1208 have a spectrum to satisfy the Nyquist condition. The signals are led to the high pass filters 1221 and 1222 having characteristics, in the frequency domain, which are symmetrical against the Nyquist frequency ($fc/2$) [$fc$: clock frequency] axis, so that a jitter free condition is obtained. The output signals are differentiated by differentiators 1223 and 1224 and squared by squaring circuits 1225 and 1226 in order to obtain clock component ($fc$). Thus components ($x$, $y$) are summed in summer 1227, and the signal is passed through band pass filter 1228 to phase locked loop circuit 1229.

Figure 13:
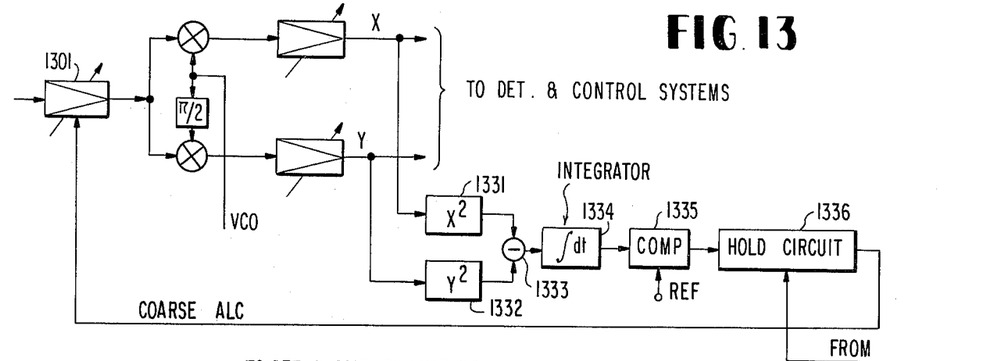
FIG. 13 is a block diagram of the coarse automatic level control circuit used in the system of FIG. 11.

The purposes of coarse automatic level control are to deduct the signal dynamic range for the demodulator and to make the coarse carrier recovery operation easy. Coarse automatic level control is performed at the amplifier 1301 in the IF band before demodulation as shown in FIG. 13. The automatic level control is operated by detecting ($x^2+y^2$), accummulating ($x^2+y^2$) in integrator 1334, comparing the accumulated result to the reference of nominal average power in comparator 1335 and feeding back the control signal to the amplifier 1301, until the coarse carrier is recovered and the monitor circuit decides to switch the mode. When the monitor decides the mode change, the coarse automatic level control loop is held in hold circuit 1336 and keeps the final state as long as the monitor operates in normal conditions.

For coarse carrier recovery, a circular window is established on the carrier phase plane. The diameter and the center of the window is chosen as D and the origin, respectively. When the amplitude of the input signal is located within the window, the phase difference between the signal and the reference are fed back to a voltage controlled oscillator as the phase error signal. Any signal whose amplitude is not within the window is ignored by the control. D is chosen such as the amplitude of the signal within the window should be one level.

Figure 14:
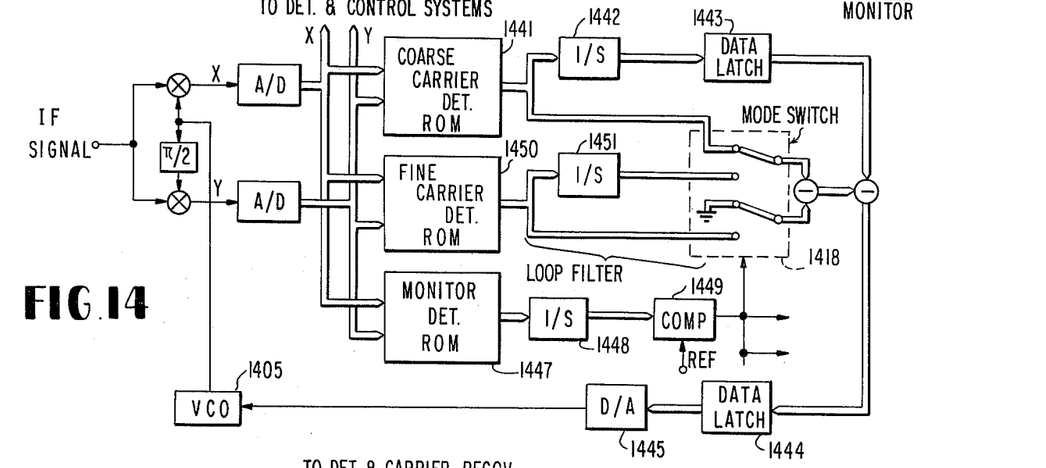
FIG. 14 is a block diagram of the carrier recovery and monitor circuit used in the system of FIG. 11.

The block diagram of the carrier recovery, including both coarse carrier recovery and fine carrier recovery, and monitor is shown in FIG. 14. Analog-to-digital converted $x$ and $y$ signals are fed into the coarse carrier detector read only memory 1441. These signals are supplied to address lines of the read only memory. There are two types of output, +1 and −1, corresponding to input signal phase, in the window, and another signal on the outside of the window is ignored, then the output is 0. Therefore, the read only memory 1441 acts as two-phase detector with three output levels. The output signal passed through the loop filter with integrator [$F(s) = (a/s) + b$] 1442, the data latch circuits 1443 and 1444 and the digital-to-analog converter 1445 to the voltage controlled oscillator 1405.

Analog-to-digital converter $x$ and $y$ signals are also fed into the monitor detector read only memory 1447. The output level of this read only memory is +1 or 0, and the output is integrated in integrator 1448 and is compared with a certain reference level at comparator 1449. When the output of integrator 1448 exceeds the reference level, the monitor circuit generates the command signal for mode change.

For fine carrier recovery, the output of the read only memory 1450 is passed through the loop filter with integrator 1451, the data latch circuit 1444 and the digital-to-analog converter 1445 to the voltage controlled oscillator 1405. In order to smooth the switching transition from coarse mode to fine mode, the final level of the coarse carrier control loop is stored and is added to the fine carrier control loop.

The fine automatic level control is performed by the decision feed back control in the same manner as carrier recovery. The level is controlled at $x$ and $y$ baseband amplifiers 1509 and 1510, respectively, as shown in FIG. 15.

The level detector is constructed by read only memories 1561 and 1562, respectively, which provides as outputs +1 to control the gain in increasing direction and −1 to control the gain in decreasing direction. Each output of read only memories 1561 and 1562 is passed through a corresponding integrator 1563 or 1564, data latch circuit 1565 or 1566 and digital-to-analog converter 1567 or 1568 and is fed back to the amplifier 1509 or 1510.

Figure 15:
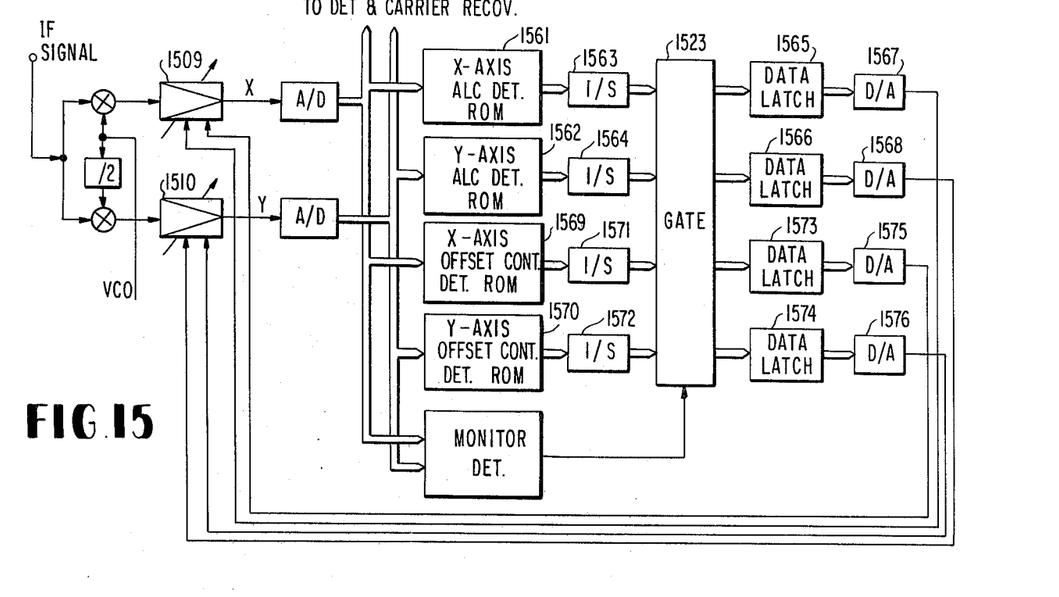
FIG. 15 is a block diagram of the automatic level control and offset control circuits used in the system of FIG. 11.

The offset control is also shown in FIG. 15 and is almost the same as that of fine automatic level control. Specifically, read only memories 1569 and 1570 provide +1 and −1 outputs which are integrated by respective integrators 1571 and 1572. The outputs of integrators 1571 and 1572 are passed through data latches 1573 and 1574 and digital-to-analog converters 1575 and 1576 to amplifiers 1509 and 1510, respectively.

Returning now to FIG. 11, it will not be appreciated that the coarse carrier recovery circuit 1115, the fine carrier recovery circuit 1116 and the monitor circuit 1117 which receive the $x$ and $y$ outputs from the analog-to-digital converters 1111 and 1112 are implemented as shown in FIG. 14. The outputs of the coarse carrier recovery circuit 1115 and fine carrier recovery circuit are supplied through a mode switch 1118, corresponding to 1418 shown in FIG. 14, to voltage controlled oscillator 1105, corresponding to 1405 shown in FIG. 14. The mode switch 1118 is controlled by the output of comparator 1449 of the monitor circuit 1117.

The fine automatic level control circuits 1119 and 1120 and the offset control circuits 1121 and 1122 are shown in FIG. 15. The outputs of these circuits are supplied through gate 1123 to amplifiers 1109 and 1110. The gate 1123 corresponds to gate 1523 in FIG. 15 and is controlled by the monitor circuit 1117.

The embodiments specifically disclosed herein have been limited to four-dimensional codes. Specifically, in the embodiment illustrated in FIGS. 2 and 3, a four-dimensional code is transmitted in a single pulse using phase, amplitude and polarization modulation. In the embodiment illustrated in FIGS. 4 and 5, a four-dimensional code is transmitted in two successive pulses using quadrature amplitude modulation. It will now be apparent to those skilled in the art that the invention may be advantageously used to transmit an eight-dimensional or even a 16-dimensional code. For example, an eight-dimensional code can be transmitted in two successive pulses using phase, amplitude and polarization modulation combining the teachings of the embodiment of FIGS. 2 and 3 with the embodiment of FIGS. 4 and 5. Alternatively, an eight-dimensional code can be transmitted in four successive pulses using quadrature amplitude modulation.

It will therefore be apparent that the embodiments shown are only exemplary and that various modifications can be made in construction and arrangement within the scope of the appended claims.

I claim:

1. A multidimensional code communication system comprising:

encoding means for receiving a multibit digital word and generating at least two pairs of analog voltages, each pair of analog voltages corresponding to the rectangular coordinates of said code plotted in two-dimensional space, modulator means responsive to said pairs of analog voltages for modulating pulsed radio frequency energy in amplitude, phase and at least one other variable, receiver means for receiving the modulated pulsed radio frequency energy and demodulating said energy to derive said at least two pairs of analog voltages, and decoding means responsive to said derived pairs of analog voltages for generating an output corresponding to said multibit digital word, said decoding means including word generating means responsive to said derived pairs of analog voltages for generating at least two multibit digital words based on the hypotheses that at least one selected bit is a binary 0 or 1, respectively, difference means responsive to said derived pairs of analog voltages for generating difference signals between each received pair of analog voltages and the rectangular coordinates corresponding to the multibit digital words based on each of said hypotheses, and means responsive to said difference signals for selecting one of said multibit digital words from said word generating means as an output.

2. A multidimensional code communication system as recited in claim 1 wherein said encoding means comprises:

means for dividing said multibit digital word into at least two groups of bits, and at least two pulse generators, each responsive to one of said groups of bits, for generating said pairs of analog voltages.

3. A multidimensional code communication system as recited in claim 2 wherein said pulse generators each comprise:

a read only memory receiving one of said groups of bits as an address and generating two digital outputs corresponding to $x$ and $y$ rectangular coordinates of said code, and digital-to-analog converting means for converting the $x$ and $y$ digital outputs to $x$ and $y$ analog voltages.

4. A multidimensional code communication system as recited in claim 1 wherein said at least one other modulating variable is polarization.

5. A multidimensional code communication system as recited in claim 4 wherein said modulator means comprises:

a first hybrid coupler for receiving at one of its input ports a source of radio frequency energy, first and second phase shifters controlled by a first of said analog voltages and connected to the output ports of said first hybrid coupler, a second hybrid coupler connected to receive the phase shifted outputs from said first and second phase shifters, a third hybrid coupler having one input port connected to one output port of said second hybrid coupler, third and fourth phase shifters controlled by a second of said analog voltages and connected to the output ports of said third hybrid coupler, a fourth hybrid coupler connected to receive the phase shifted outputs from said third and fourth phase shifters, fifth and sixth phase shifters controlled by the third and forth, respectively, of said analog voltages and connected to the output ports of said fourth hybrid coupler, and polarization diversity means for combining the outputs of said fifth and sixth phase shifters in a single, orthogenally polarized pulse.

6. A multidimensional code communication system as recited in claim 1 wherein said at least one other modulating variable is time so that at least two pulses of radio frequency are generated in timed sequence for each input multibit digital word.

7. A multidimensional code communication system as recited in claim 6 wherein said modulator means comprises means for quadrature amplitude modulating each pulse with one of said pairs of analog voltages.

8. A multidimensional code communication system as recited in claim 6 wherein said decoding means further comprises buffer storage means for storing the outputs of said word generating means and said difference means until the last pulse in said timed sequence is received.

9. A multidimensional code communication system as recited in claim 1 wherein said decoding means further comprises analog-to-digital converting means for converting said derived pairs of analog voltages to digital outputs corresponding to $x$ and $y$ coordinates of said code, and said word generating means and said difference means each comprise read only memories which receive the $x$ and $y$ digital outputs as addresses.

10. A multidimensional code communication system as recited in claim 9 wherein said means responsive to said difference signals comprise:

a read only memory receiving the output of said difference means as an address and producing a control signal, and switch means receiving the multibit digital words generated by said word generating means and controlled by said control signal to provide as an output only one of said multibit digital words.

* * * * *

UNITED STATES PATENT AND TRADEMARK OFFICE
CERTIFICATE OF CORRECTION

PATENT NO. : 4,084,137  
DATED : April 11, 1978  
INVENTOR(S) : George R. WELTI

Page 1 of 4

It is certified that error appears in the above-identified patent and that said Letters Patent are hereby corrected as shown below:

IN THE ABSTRACT:

Column 2, line 6 - delete "plane" insert -- planes -- line 15 - delete "to" insert -- of --

IN THE SPECIFICATION:

Column 2, line 37 - delete "$b_6 b_7$" insert -- $b_6$, $b_7$ -- line 68 - delete "codes" insert -- coge --

Column 3, line 39 - delete "Y" insert -- y -- (two occurrences)

line 59 - delete "$x_i 1$" insert -- $x_{i1}$ -- line 61 - delete "$Y_i 1$" insert -- $y_{i1}$ -- line 61 - delete "$Y_0$" insert -- $y_0$ --

UNITED STATES PATENT AND TRADEMARK OFFICE
CERTIFICATE OF CORRECTION

PATENT NO. : 4,084,137

DATED : April 11, 1978

INVENTOR(S) : George R. WELTI

It is certified that error appears in the above—identified patent and that said Letters Patent are hereby corrected as shown below:

Column 3, line 63 - delete "$x_i 2$" insert -- $x_{i2}$ -- line 63 - delete " = " (second occurrence) insert -- + -- line 65 - delete "$Y_i 2$" insert -- $y_{i2}$ -- line 65 - delete "$Y_0$" insert -- $y_0$ --

Column 4, line 12 - delete "$+k_i + k_j$" insert -- $+k_i - k_j$ -- line 15 - delete "$k_i \pm k_j$" insert -- $k_i \neq k_j$ -- line 16 - delete " + " (two occurrences) insert $\pm$ both occurrences

Column 5, line 6 - before "$\hat{E}_2$" delete -- ( -- line 20 - delete " $\bar{\gamma}$ " insert -- $\hat{\gamma}$ -- line 27 - after "for" insert -- a --

UNITED STATES PATENT AND TRADEMARK OFFICE
CERTIFICATE OF CORRECTION

PATENT NO. : 4,084,137
DATED : April 11, 1978
INVENTOR(S) : George R. WELTI

It is certified that error appears in the above-identified patent and that said Letters Patent are hereby corrected as shown below:

Column 6, line 20 - after "decoding" insert -- logic -- line 31 - delete "$Y_V$" insert -- $y_v$ --

Column 7, line 29 - delete "$(b_5, b_5, b_7)$" insert -- $(b_5, b_6, b_7)$ -- line 29 - delete "hypotheses" insert -- hypothesis -- line 26 - delete "digital" insert -- digits --

Column 8, line 19 - delete "sympton" insert -- symptom --

Column 10, line 26 - delete "not" insert -- now -- line 32 - after "circuit" insert "1116" (second occurrence)

UNITED STATES PATENT AND TRADEMARK OFFICE
CERTIFICATE OF CORRECTION

PATENT NO. : 4,084,137
DATED : April 11, 1978
INVENTOR(S) : George R. WELTI

It is certified that error appears in the above-identified patent and that said Letters Patent are hereby corrected as shown below:

IN THE CLAIMS:

Column 12, line 22 - delete "orthogenally" insert
-- orthogonally -- line 25 - delete "time" insert -- timed --

Signed and Sealed this

Twenty-eighth Day of November 1978

[SEAL]

Attest:

RUTH C. MASON
Attesting Officer

DONALD W. BANNER
Commissioner of Patents and Trademarks